United States Patent [19]

Talaugon

[11] Patent Number: 4,838,611
[45] Date of Patent: Jun. 13, 1989

[54] CAR SEAT PILLOW

[76] Inventor: Margie C. Talaugon, 615 Solano Ave., Sonoma, Calif. 95476

[21] Appl. No.: 190,505

[22] Filed: May 5, 1988

[51] Int. Cl.$^4$ .......................... A47C 1/10; B60R 22/28
[52] U.S. Cl. .................................... 297/391; 297/397; 297/482
[58] Field of Search ............... 297/464, 482, 393, 391, 297/397, 484

[56]  References Cited

U.S. PATENT DOCUMENTS

| | | | |
|---|---|---|---|
| 1,510,187 | 9/1924 | Martin | 297/393 |
| 3,779,599 | 12/1973 | Gottfried | 297/484 |
| 4,236,264 | 12/1980 | Britzman | 297/393 X |
| 4,550,458 | 11/1985 | Flore | 297/393 |
| 4,738,488 | 4/1988 | Camelio | 297/391 |

Primary Examiner—J. McCall
Attorney, Agent, or Firm—Flehr, Hohbach, Test, Albritton & Herbert

[57] ABSTRACT

Car seat pillow having a pair of side cushions engageable with opposite sides of the child's head, a neck cushion extending between the side cushions, and tether straps for attaching the cushions to the shoulder straps of a car seat with the side cushions being postioned above the shoulder straps toward opposite sides of the seat for supporting engagement with the child's head and the neck cushion being positioned toward the back of the seat for engagement with the back of the child's neck.

15 Claims, 1 Drawing Sheet

CAR SEAT PILLOW

This invention pertains generally to car seats for infants and other small children, and more particularly to a pillow for supporting the head of a child in a car seat.

One problem with the car seats which are commonly used for transporting infants and other small children in motor vehicles is that they do not provide proper support for the heads and necks of the children. As a result, children frequently experience discomfort when riding in such seats, particularly if they fall asleep and their heads fall to the side. This lack of support can cause a child to awaken prematurely due to the discomfort in his neck and, in the event of an accident, can result in a serious injury to the child.

It is in general an object of the invention to provide a new and improved pillow for supporting the head of a child riding in a car seat.

Another object of the invention is to provide a pillow of the above character which can be employed with existing car seats.

Another object of the invention is to provide a pillow of the above character which can be manufactured economically.

These and other objects of the invention are achieved in accordance with the invention by providing a car seat pillow having a pair of side cushions engageable with opposite sides of the child's head, a neck cushion extending between the side cushions, and means for attaching the cushions to the shoulder straps of a car seat with the side cushions positioned above the shoulder straps toward opposite sides of the seat for supporting engagement with the child's head and the neck cushion positioned toward the back of the seat for engagement with the back of the child's neck.

Figure 1:
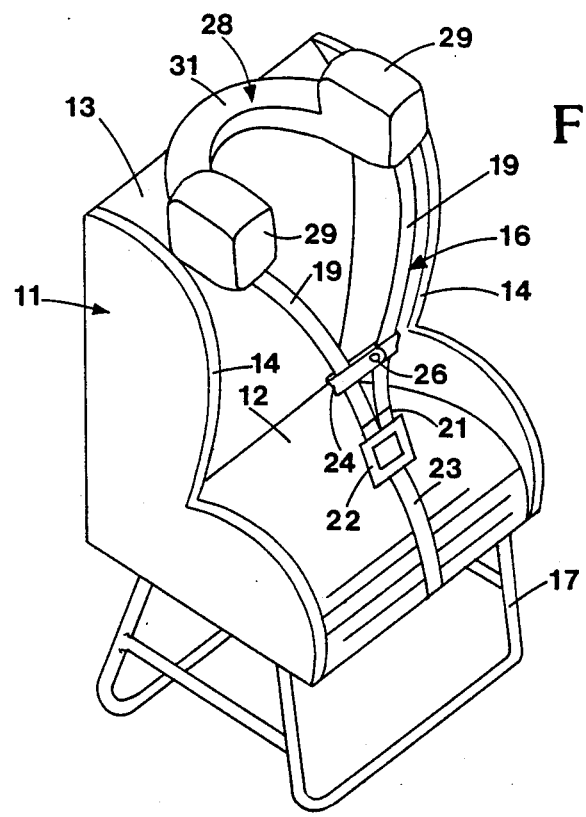
FIG. 1 is an isometric view of one embodiment of a car seat with a pillow for supporting a child's head in accordance with the invention.
Figure 2:
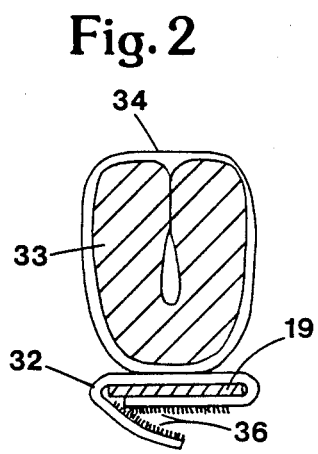
FIG. 2 is a cross sectional view of one of the side cushions in the pillow of FIG. 1.

In the drawings, the invention is illustrated in connection with a car seat 11 of conventional design. The car seat has a cushioned seat 12, a cushioned back 13 and cushioned arms 14, with a harness assembly 16 for retaining a child in the seat and legs 17 which are adapted to rest upon the seat of an automobile or other vehicle.

The harness assembly includes a pair of shoulder straps 19 which are anchored to the frame in the back of the seat and extend in a forward and downward direction over the shoulders and chest of the child. The lower ends of the straps terminate in buckle plates 21 which are received in a buckle 22 which is attached to the upper or free end of a crotch strap 23. The lower end of the crotch strap is affixed to the frame of the car seat below cushioned seat 12. A short strap 24 encircles the two shoulder straps and holds them together in front of the child's chest. The ends of this strap are releasably secured together by a snap 26.

The pillow, designated generally by the reference numeral 28, has a pair of side cushions 29 for supporting engagement with the sides of the head of a child in the car seat and a neck cushion 31 for supporting engagement with the back of the child's neck. The pillow also has a tether strap 32 on the underside of each of the cushions for attaching the pillow to the shoulder straps of the car seat. As illustrated in FIG. 1, when the pillow is attached to the shoulder straps, the side cushions are positioned above the shoulder straps toward the sides of the seat, and the neck cushion is curved arcuately between the rear portions of the side cushions.

The cushions are sized to provide a maximum of comfort and support for the head and neck of a child in the car seat. In one presently preferred embodiment, each of the side cushions has a thickness on the order of two inches and a height on the order of three inches, and the neck cushion has a thickness on the order of one inch and a height on the order of one and one-half inches. With these dimensions, the side cushions rest against the upper portions of the arms of the car seat and support the child's head if it should fall or lean to the side, and the neck cushion fits comfortably beneath the bulge at the rear of the head.

In the embodiment illustrated, the cushions have a body of foam 33 and a flexible fabric cover 34 over the foam. However, it will be understood that the cushions can be formed in any other suitable manner. Tether straps 32 are secured to the abric cover by stitching (not shown), and these straps have Velcro fasteners 36 for releasably securing them about the shoulder straps of the car seat.

Figure 3:
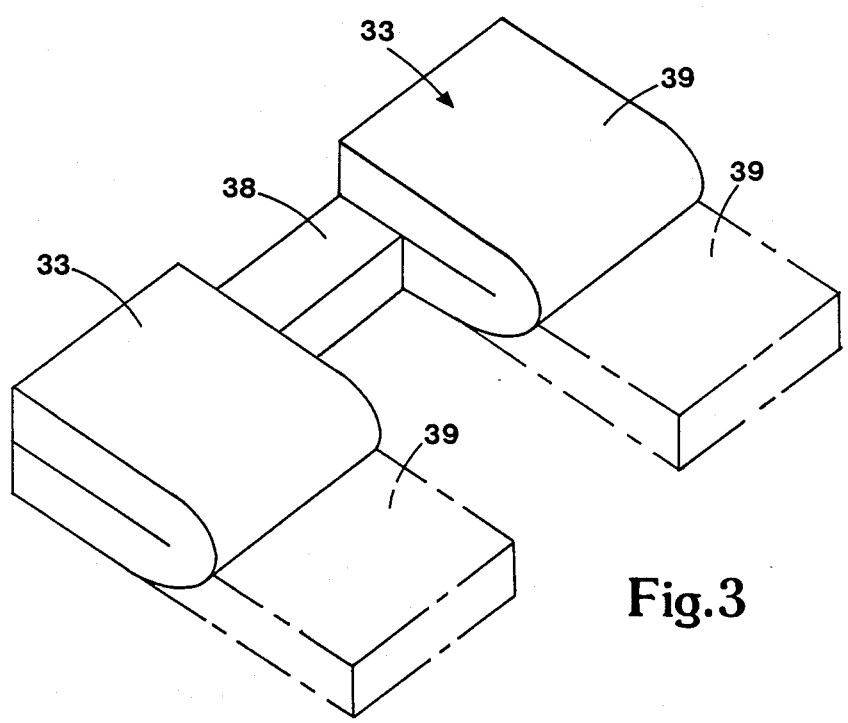
FIG. 3 is an isometric view showing the formation of the cushion structure in the embodiment of FIG. 1.

As best illustrated in FIG. 3, the body of foam 33 for the cushions is cut in the shape of U, with the base 38 of the U-shaped piece having a length corresponding to the length of neck cushion 31, and the legs 39 of the U-shaped piece having a length corresponding to twice the height of the side cushions. The sheet of foam has a thickness corresponding to the thickness of the neck cushion, and legs 39 are folded over on themselves to form the side cushions. After the foam is folded, the fabric cover is stitched over it, and thereafter the foam is retained in the folded condition by the cover.

Operation and use of the pillow are as follows. The pillow is bent to a semicircular shape and attached to on the car seat by placing side cushions 29 on top of shoulder straps 19 and fastening tether straps 32 around the shoulder straps. Thereafter, the shoulder straps hold the pillow in the arcuate shape.

With the pillow in place, a child can be placed in the car seat, and the harness straps can be secured in the normal manner. If the child sits upright in the car seat, the cushions will not interfere with the normal movement of his head. If, however, he leans to the side or to the rear, the cushions will engage his neck and/or the sides of his head and support them in a comfortable position.

It is apparent from the foregoing that a new and improved pillow has been provided for supporting the head and neck of a child in a car seat. While only one presently preferred embodiment has been described in detail, as will be apparent to those familiar with the art, certain changes and modifications can be made without departing from the scope of the invention as defined by the following claims.

I claim:

1. In a pillow for supporting the head of a child in a car seat with shoulder straps for retaining the child in the seat: a pair, of side cushions engageable with opposite sides of the child's head, a neck cushion extending between the side cushions for engagement with the back of the child's neck, and tether straps on the under sides of the side cushions for engagement with the shoulder straps to mount the pillow on the shoulder straps in a generally semicircular position with the side cushions being positioned above the shoulder straps for supporting engagement with the sides of the child's head and the neck cushion being positioned toward the back of the car seat for engagement with the back of the child's neck.

2. The pillow of claim 1 wherein the side cushions and the neck cushion are formed as a unitary structure.

3. The pillow of claim 1 wherein the cushions comprise a body of cushioning material and a fabric cover over the cushioning material.

4. The pillow of claim 1 wherein the neck cushion is of lesser vertical extent than the side cushions.

5. The pillow of claim 1 wherein the tether straps encircle the shoulder straps.

6. In a pillow for supporting the head of a child in a car seat with shoulder straps for retaining the child in the seat: a pair of cushions engageable with opposite sides of the child's head, and means for mounting the cushions to the top sides of the shoulder straps with not other connection between the pillow and the car seat.

7. The pillow of claim 6 wherein the means for mounting the cushions on the car seat comprises tether straps on the under sides of the cushions for engagement with the shoulder straps.

8. The pillow of claim 6 including a neck cushion extending arcuately between the other cushions for engagement with the back of the child's neck.

9. The pillow of claim 8 wherein the neck cushion is of lesser vertical extent than the other cushions.

10. The pillow of claim 6 wherein the cushions comprise a body of cushioning material and a flexible cover over the cushioning material.

11. In combination: a car seat having shoulder straps which pass over the shoulders of a child sitting in the seat, a pair of cushions engageable with opposite sides of the child's head, and means for attaching the cushions to the shoulder straps with the cushions being mounted on the top sides of the straps toward opposite sides of the car seat and being movable with the straps relative to the remainder of the car seat.

12. The pillow of claim 11 wherein the means for attaching the cushions to the shoulder straps comprises tether straps on the under sides of the cushions which encircle the shoulder straps.

13. The pillow of claim 11 including a neck cushion extending arcuately between the other cushions for engagement with the back of the child's neck.

14. The pillow of claim 13 wherein the neck cushion is of lesser vertical extent than the other cushions.

15. The pillow of claim 14 wherein the cushions comprise a body of cushioning material and a flexible cover over the cushioning material.

* * * * *